F. ENGEL.
DASH POT.
APPLICATION FILED APR. 17, 1915.
1,182,258.
Patented May 9, 1916.
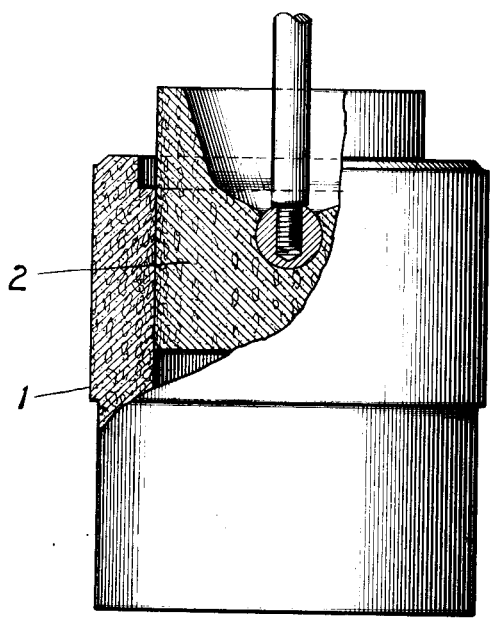

UNITED STATES PATENT OFFICE.

FRANK ENGEL, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DASH-POT.

1,182,258.  Specification of Letters Patent.  Patented May 9, 1916.

Application filed April 17, 1915. Serial No. 22,051.

*To all whom it may concern:*

Be it known that I, FRANK ENGEL, a citizen of the United States, residing at Niagara Falls, in the county of Niagara and State of New York, have invented new and useful Improvements in Dash-Pots, of which the following is a specification.

This invention relates to dash-pots.

It is one of the objects of the invention to provide a dash-pot upon which the effect of wide variations in temperature will be practically negligible.

Another object of the invention is to provide the parts of a dash-pot of a self-lubricating material.

Still another object of the invention is to provide a strong, durable and inexpensive dash-pot.

Referring to the drawing, there is shown one embodiment of the invention. A cup 1 is shown in coöperative relation with a plunger 2. The cup and plunger are constructed of a composition of bakelite and graphite. The bakelite is a composition of phenol, formaldehyde and a filler, preferably asbestos, mixed together preferably in powdered form. The bakelite and flaked graphite are thoroughly mixed by air or other suitable means. The product of these ingredients is then subjected to the application of heat and pressure and produces a body which has all the attributes of strength, durability, minimum contraction or expansion under variable temperatures, and self-lubrication.

It will be obvious from the drawing that the contacting surfaces of the cup and plunger respectively are extensively impregnated with the particles of graphite which lubricate these surfaces and maintain an easy sliding fit between the parts at all times and under all thermostatic conditions.

It is not intended that the invention be limited to the use of any one of the above set forth ingredients in its highly technical interpretation, but rather that the terms phenol, formaldehyde and graphite shall include all reasonable derivatives, departures or variations which, by any reasonable construction might be interpreted as in the nature of any one of these ingredients.

What I claim as new and desire to secure by Letters Patent of the United States, is—

1. In a dash-pot, in combination, a cup comprising bakelite and graphite set together in a hard body, and a plunger movable within said cup.

2. In a dash-pot, in combination, a cup, and a plunger comprising bakelite and graphite set together in a hard body and movable within said cup.

3. In a dash-pot, in combination, a cup comprising bakelite and graphite set together in a hard body, and a plunger comprising the same ingredients, movable within said cup.

4. The method of making dash-pots which consists in mixing together bakelite and graphite and molding the product into hard insoluble bodies in the form of a cup and a plunger respectively by the application of heat and pressure.

5. The method of making dash-pots which consists in mixing powdered bakelite and flaked graphite and molding the product into hard insoluble bodies in the form of a cup and a plunger respectively by the application of heat and pressure.

In witness whereof, I have hereunto subscribed my name.

FRANK ENGEL.